United States Patent [19]

Campbell et al.

[11] 3,715,518

[45] Feb. 6, 1973

[54] INTERRUPT NETWORK TO PROTECT A VOICE FREQUENCY SIGNAL DETECTOR FROM BEING TALKED-OFF BY OUTGOING SPEECH SIGNALS

[75] Inventors: Robert Riddle Campbell, Holmdel; George Herbert Honnold, Middletown; Michael Lefkowitz, Old Bridge, all of N.J.

[73] Assignee: Bell Telephone Laboratories, Incorporated, Murray Hill, N.J.

[22] Filed: Dec. 8, 1971

[21] Appl. No.: 205,805

[52] U.S. Cl. ....................179/84 VF, 179/6 E

[51] Int. Cl. ....................H04m 1/50

[58] Field of Search ..........179/84 VF, 81 R, 5 R, 5 P, 179/2 A, 6 R, 6 E

[56] References Cited

UNITED STATES PATENTS 3,433,902 3/1969 Butcher....................179/84 VF 3,549,821 12/1970 Langendorf....................179/6 E 2,206,080 7/1940 Davis....................179/170.4

*Primary Examiner*—Kathleen H. Claffy

*Assistant Examiner*—W. A. Helvestine

*Attorney*—R. J. Guenther et al.

[57] ABSTRACT

A station set which includes a two-way voice channel interconnects a telephone line and a voice recorder. The station set receiver detects incoming voice-frequency tone signals an, in response thereto, instructs the recorder to record, play back, select desired records, stop, et cetera. The playback signals may also contain the tone signals and the receiver is protected from being talked-off by the reflection of these outgoing signals. The protection involves momentarily interrupting the outgoing transmission when the tone signals are detected and enabling the station set to provide instructions to the recorder only in the event that detection of the tone signals continues during the interrupt interval. The duration of the interrupt interval is short so that the playback interruption is not objectionable and may not even be noticed by a listener.

8 Claims, 2 Drawing Figures

INTERRUPT NETWORK TO PROTECT A VOICE FREQUENCY SIGNAL DETECTOR FROM BEING TALKED-OFF BY OUTGOING SPEECH SIGNALS

FIELD OF THE INVENTION

This invention relates to signal controlled station sets for interconnecting telephone lines and station equipment, such as a voice recorder, and relates to controlling the voice recorder in response to incoming tone or data signals occupying narrow frequency bands within the voice frequency range. More particularly, this invention relates to the detection of the control tone signals in the presence of other signals in the voice frequency range, such as speech signals.

DESCRIPTION OF THE PRIOR ART

In recent years there has been an interest in data sets which contain two-way voice channels. An application for such a data set is for enabling remote subscribers to retrieve and update voice information stored in a voice recording machine. The data set receiver has the capability of detecting incoming voice frequency data signals, which may assume the form of tone signals. In response to the tone signals, the data set is preferably arranged to instruct the machine to perform various functions. Typical ones of the functions are the operations of recording, playing back, selecting appropriate or desired "records" and stopping.

An inspection of the machine functions reveals that instructions may be received from the remote subscriber while the machine is in the recording mode (or, alternatively, the play back mode). It is therefore apparent that the data set receiver must distinguish between incoming tone signals and speech signals. More particularly, the receiver must be safeguarded from detecting those speech signals which, for short intervals, simulate tone signals. This is accomplished by timing circuits that set criteria for the duration of the tone signal, permitting the receiver to detect the tone signal only if the incoming tone persists for a predetermined interval of time.

The timing circuits that set the criteria for the duration of the tone signals delay the passage of the detected tone signal control information to the voice recording machine. During this delay interval the tone signals will be passed to the voice recording machine through the two-way voice channel. If the voice recording machine is in the "record" mode the tone signals will then be recorded. These tone signals will then be sent back through the two-way voice channel toward the telephone line when the recording is played back. This two-way channel includes a directional control circuit, such as a hybrid junction, to direct the "play back" to the line and not to the data set receiver. Some reflection of the "play back" occurs, however, including reflection of the tone signals.

It is an object of this invention to preclude operation of the receiver in response to reflected tone signals.

SUMMARY OF THE INVENTION

In accordance with the present invention, when tone signals are received from the line, the outgoing playback signaling is interrupted for a momentary interval of time. If the tone signals continue to be received, the data set is enabled to perform its various control functions. In the illustrative embodiment of this invention, the data set receiver is arranged to detect tone signals received from the line and to develop control signals in response to the tone signals. The receiver detector provides the indication of the initial reception of the tone signals. The development of control signals is precluded, however, until it is determined that tone signals are being detected during the interruption of the outgoing signals.

The duration of the momentary interruption is determined by a timing circuit which is arranged to time an interval having a short duration of time so that interruption of the outgoing speech signals is not annoying and may not even be noticed by the remote listener.

In accordance with a feature of this invention, the interruption of the outgoing signals is provided by a switch which, when operated by the timing circuit, opens the outgoing path.

In accordance with another feature of this invention, development of the control signals is enabled by the continuing detection of the tone signals for the full interrupt interval. The enablement is accomplished by a gate which extends the output of the tone detector to the control signal developing means.

The foregoing and other objects and features of this invention will be more fully understood from the following description of an illustrative embodiment thereof taken in conjunction with the accompanying drawing.

DETAILED DESCRIPTION

Figure 1:
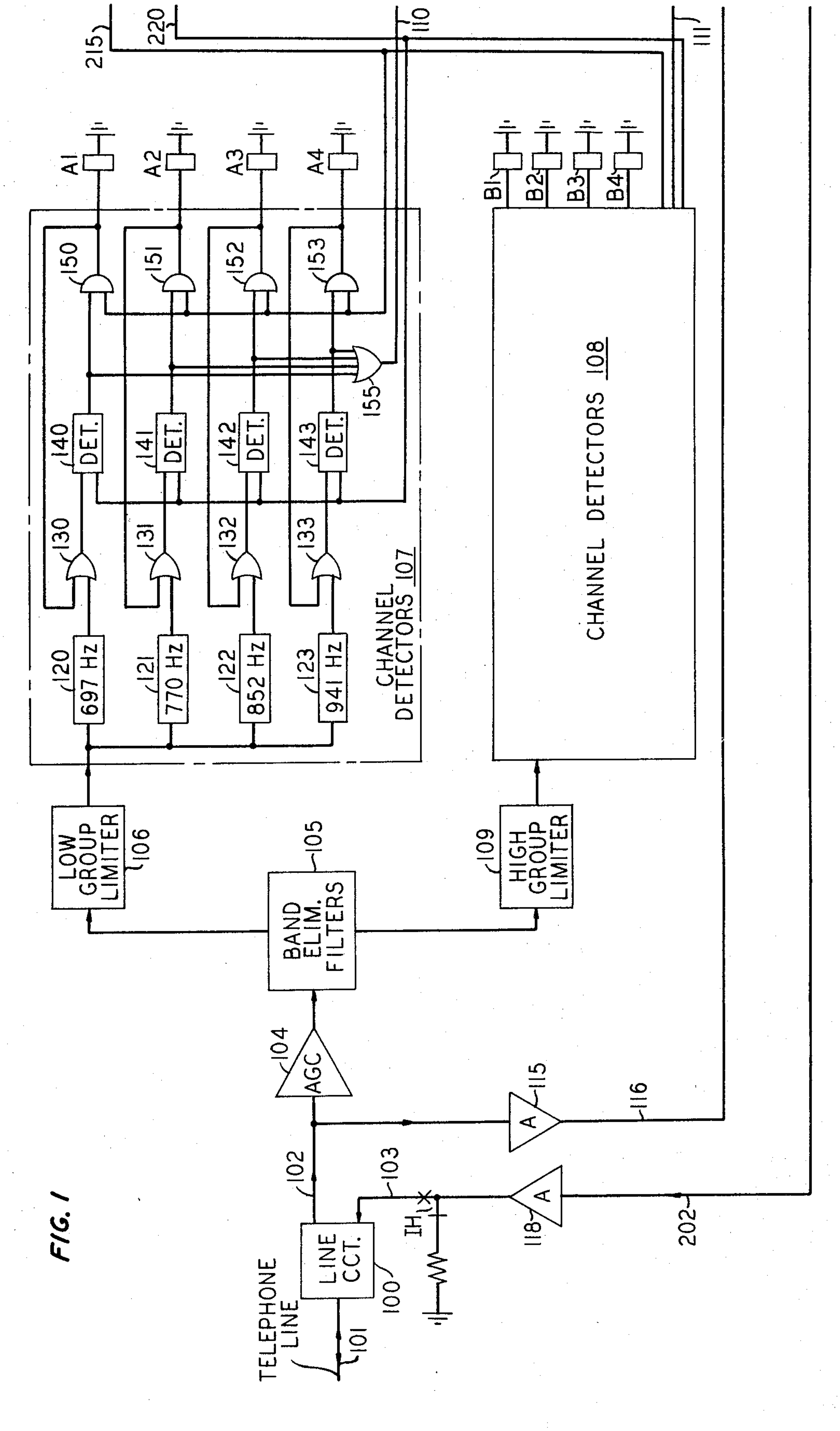
FIG. 1 and FIG. 2, when arranged side by side, depict, in schematic form, the circuits and equipment of a station set for interconnecting a telephone line and a voice recording machine in accordance with this invention.

In accordance with the present invention, the data set is interposed between subscriber's equipment or machine and a telephone line. The telephone line is shown in FIG. 1 and is identified as telephone line 101.

In the illustrative embodiment it is presumed that the subscriber's equipment (not shown) comprises a voice recording machine having an incoming or receive voice path, an outgoing or transmit voice path and having control leads for controlling the starting up of the machine, for returning a signal after startup to indicate that the machine is ready, and for enabling the machine to record incoming voice messages or to select and play back recorded voice messages. The voice paths and control leads of the subscriber's machine are interconnected with the data set by way of terminals which are shown vertically aligned in the righthand portion of FIG. 2. The various control leads for instructing the machine to "record" or "play back" and to select appropriate "records" advantageously terminate on terminals A Common, A10, A20, A30 and A40 and, in addition, terminate on terminals B Common, B10, B20, B30 and B40. The control lead for turning on or starting up the machine terminates on the "Ring Indicator" terminal. The lead for returning the signal indicating that the machine is ready terminates on the "Equipment Ready" terminal. A machine control lead enabling the machine to respond to the various control signals and provide the corresponding function terminates on the "Data Carrier Detector" terminal. Finally, the voice path for incoming voice signals terminates on the terminal pair designated "Receive Voice" and the voice path for the outgoing voice signals during playback terminates on the terminal pair designated "Transmit Voice."

Telephone line 101 extends to line circuit 100 in the data set. Line circuit 100 constitutes a conventional type of line circuit which includes a ringing signal detector and switch hook contacts. In addition, line circuit 100 includes a hybrid circuit which passes incoming signals from telephone line 101 to lead 102 and at the same time passes outgoing signals on lead 103 to telephone line 101.

The various functions of line circuit 100, as previously described, are functions performed by conventional line circuits. It is, of course, realized that data set line circuits may perform additional functions. Such additional functions include the provision of delay or guard intervals to permit disabling of echo suppressors, the returning of appropriate tone signals to provide interconnection of the data set with a remote calling data set, and the generation and transmission of answerback signals to identify the data set. A disclosure of a line circuit providing these various functions is shown in U.S. Pat. No. 3,113,176, issued to T. L. Doktor on Dec. 3, 1963.

During any connection with a remote subscriber, control signals may be received from the remote subscriber to place the local subscriber equipment in the "record" mode or to select a record and place the machine in the "playback" mode. In addition, during the connection, voice signals may be received and recorded by the machine or, during playback, voice signals may be transmitted by the machine and passed to telephone line 101.

Figure 2:
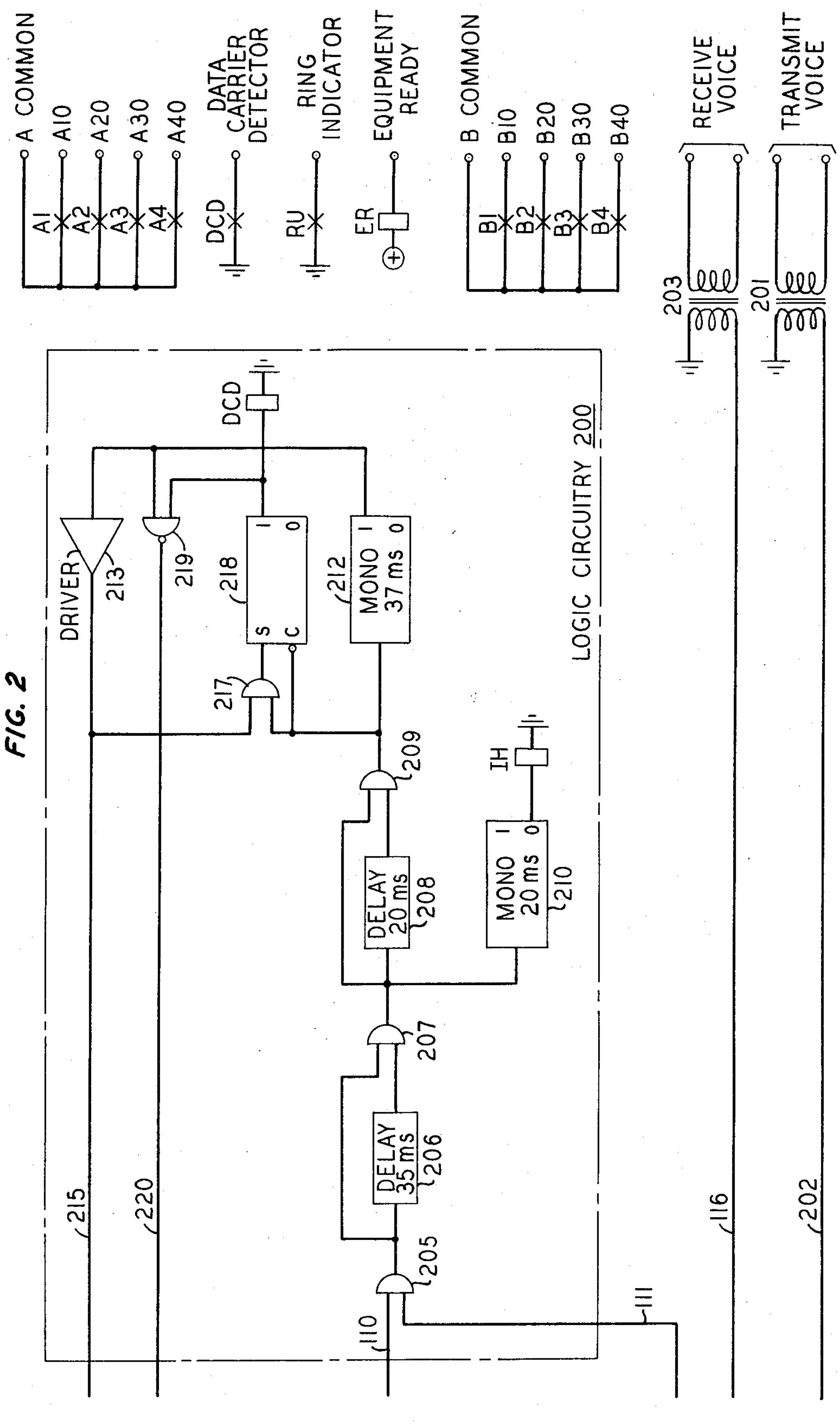

Incoming voice signals on telephone line 101, which are to be recorded, are passed by way of line circuit 100 and lead 102 to amplifier 115. The amplified voice signals are then applied through lead 116 to the primary winding of transformer 203 (FIG. 2). The secondary winding of transformer 203 is connected across the terminals "Receive Voice."

The played back voice signals are applied across terminals "Transmit Voice" as previously discussed. Terminals "Transmit Voice," in turn, are connected across the primary winding of transformer 201. The secondary winding of transformer 201 is connected to lead 202. Lead 202 extends to the input of amplifier 118. The output of amplifier 118 extends to the make and break contacts of relay IH. The core of relay IH is shown in logic circuitry 200 (FIG. 2). As disclosed hereinafter, relay IH is normally operated, connecting the output of amplifier 118 to lead 103 and then, of course, on through the hybrid circuit in line circuit 100 to telephone line 101. As further disclosed hereinafter, when control signals are received, relay IH is momentarily released, and the output voice signals of amplifier 118 to lead 103 are momentarily interrupted and shunted to ground through the break contacts of relay IH.

In telephone signaling it is conventional to send control signals constituting pairs of tones. Each tone pair comprises a first tone which constitutes one of a group of relatively low frequency tones and a second tone which constitutes one of a group of higher frequency tones. These two tones in the pair are simultaneously transmitted and, in combination, designate a predetermined supervisory control signal.

The incoming tone signals are passed by line circuit 100 to lead 102 and then on to automatic gain amplifier 104. The amplified tone signals are applied to band elimination filters 105.

Band elimination filters 105 include band filters which pass the tone signal in the low group to low group limiter 106 and pass the tone signal in the high group to high band group limiter 109. The low group tone is thereby limited and passed to channel detectors 107 while the high group tone is limited and passed to channel detectors 108.

Channel detectors 107 include circuitry for detecting incoming tone signals in one of several narrow bands within the low group. When the low frequency tone signal in one of the narrow bands is detected, a high signal is applied to lead 110.

Channel detectors 108 are arranged in substantially the same manner as channel detectors 107. When a high frequency tone signal, within a select narrow band of the higher group, is applied to channel detectors 108, a high signal is passed to lead 111.

Leads 110 and 111 extend to logic circuitry 200. If both leads 110 and 111 are high, logic circuitry 200 recognizes that a tone pair control signal is being received. As described hereinafter, when this incoming control signal continues to be received, logic circuitry 200 momentarily releases relay IH. The release of this relay, as previously described, momentarily interrupts, in turn, the outgoing voice path through amplifier 118. If the detected tone pair constitutes a reflection of outgoing voice signals, the momentary interruption will terminate this reflection, the channel detectors will remove the high conditions on leads 110 and 111, and logic circuitry 200 will return to its initial condition. In the event, however, that the tone pair constitutes a control signal from the remote subscriber, the continuing reception will persist and, after the termination of the interruption period, logic circuitry 200 will return signal voltages by way of leads 215 and 220 to channel detectors 107 and 108. Each of the channel detectors will thereupon operate an individual one of relays A1 through A4 and relays B1 through B4 corresponding to the narrow band within which each tone signal appears. The operation of one of relays A1 through A4 extends terminal A Common to one of terminals A10 through A40. Correspondingly, the operation of one of relays B1 through B4 extends terminal B Common to one of terminals B10 through B40. The appropriate control signal is therefore passed on to the subscriber's machine.

At the same time that logic circuitry 200 applies enabling signals to leads 215 and 220, it also operates a data carrier detector relay, identified as relay DCD. The operation of relay DCD extends ground to terminal "Data Carrier Detector." This ground is then passed to the subscriber's machine to enable the machine to respond to the control signals and provide the recording or playback operation.

Assume now that an incoming call is received from a remote subscriber. This incoming call is, of course, initiated by the reception of ringing signals. The incoming ringing signals are recognized by the ringing signal detector in line circuit 100 and a relay (which is not shown but which is herein identified as relay RU) is operated. This closes contacts RU in FIG. 2, completing a path from ground to terminal "Ring Indicator." The subscriber's machine is thereby turned ON. If the subscriber's equipment is in the "ready" condition, the machine returns ground to terminal "Equipment Ready," operating relay ER. The operation of relay ER operates, in turn, the switch hook contacts in line circuit 100 to place the data set in the "off-hook" condition; that is, line circuit 100 completes an appropriate dc return path for telephone line 101. At the same time, line circuit 100 cuts through telephone line 101 to the hybrid circuit, thereby passing incoming signals on telephone line 101 to lead 102 and at the same time passing outgoing signals on lead 103 to telephone line 101. When line circuit 101 goes "off-hook," the central office, of course, terminates the ringing and the remote subscriber is informed that he can communicate with the local subscriber.

The remote subscriber now sends the appropriate control signals in the form of tone pairs in order to place the local subscriber's machine in the desired operating mode. The incoming tone pair is applied by line circuit 100 to automatic gain amplifier 104 and, as previously described, the amplified signals are then applied to band elimination filters 105, which pass the low frequency tone to low group limiter 106 and the high frequency tone to high group limiter 109. The limited low group tone is then applied to narrow band filters 120 through 123 in channel detectors 107 and the limited high group tone is applied to corresponding filters in channel detectors 108.

Assume now that the low group tone has a frequency of approximately 697 Hz. Narrow band filter 120 thereupon passes the signal through OR circuit 130 to detector 140. Detector 140 advantageously comprises a signal slicer whose threshold level is controlled by lead 220. Under this initial condition that we have assumed, the signal potential on lead 220 is such that the tone signal applied thereto must exceed some signal threshold, which threshold is such that it is readily exceeded by an incoming tone signal from the remote subscriber. Since we are receiving the tone signal from the remote subscriber, detector 140 will develop an output. This output is applied to OR gate 155, which, in turn, applies a high signal voltage to lead 110. If the low group tone has a frequency of approximately 770 Hz, 852 Hz, or 941 Hz, the signal passes through filter 121, 122 or 123. Filters 121 to 123 cooperate with OR gates 131 to 133 and signal slicer detectors 141 to 143 to apply a high signal voltage through OR gate 155 to lead 110 in the same manner as filter 120, OR gate 130 and detector 140 cooperate to apply the signal voltage to lead 110.

The application of the high frequency tone signal to channel detectors 108 correspondingly develops a high signal voltage on lead 111.

Leads 110 and 111 extend to inputs of AND gate 205 in logic circuitry 200. Since the voltage potential on both of these leads is now high, the output of AND gate 205 also goes high. This high output potential is passed to one input of AND gate 207 and, in addition, is passed to the input of delay line 206. After approximately 35 milliseconds, delay line 206 also applies a high condition to an input of AND gate 207.

With high inputs applied to the two inputs of AND gate 207, the gate, in turn, develops a high condition at its output. This high condition is passed to monopulser 210 and at the same time to one input of AND gate 209 and to the input of delay line 208. As shown in FIG. 2, monopulser 210 has a "1" or high output terminal and a "0" or low output terminal. The "0" output terminal of monopulser 210 is normally high and this high condition provides current through the core of relay IH to ground. Accordingly, relay IH is normally operated. As previously described, with relay IH operated, the output of voice amplifier 118 is extended to line circuit 100 by way of lead 103. When the positive-going transition at the output of AND gate 207 is applied to the input of monopulser 210, its "0" output terminal goes low for approximately 20 milliseconds. This terminates the current passing through the relay core and relay IH therefore releases during the 20 millisecond interval. The output connection of voice amplifier 118 to line circuit 100 is therefore interrupted during the 20 millisecond interval.

It was previously noted that the high signal output of AND gate 207 was also passed to the input of delay line 208. Delay line 208 provides a 20 millisecond delay and, after the termination of this delay, passes the high signal to AND gate 209. It is noted that this application of the high signal to AND gate 209 does not start until the momentary release of relay IH and the consequent interruption of the outgoing voice path has terminated. Assuming that the tone pair is still being received, AND gate 207 is still directly applying a high condition to one input of AND gate 209 and with delay line 208 applying a high condition to the other input, AND gate 209 passes a high condition to its output. This high condition is applied to one input of AND gate 217 and, in addition, to the input of monopulser 212. In response to this positive-going transition, the "1" terminal output of monopulser 212 goes from a normal low condition to a high condition and maintains this high condition for an interval of approximately 37 milliseconds. This high condition is applied to one input of AND gate 219 and to the input of driver 213. The output of driver 213, therefore, goes high and this high condition is passed to lead 215 and, in addition, the high condition is applied to the other input of AND gate 217. AND gate 217 is now enabled to set flip-flop 218. Flip-flop 218 SET applies a high condition to the other input of AND gate 219 and gate 219, in turn, applies a low condition to lead 220. Flip-flop 218 SET also applies current from its "1" output to the core of relay DCD. Relay DCD is operated and its make contacts pass ground to terminal "Data Carrier Detector." The machine is thereby enabled to respond to control signals that instruct the machine to operate in a desired mode.

The condition on lead 220 determines the threshold of signal slicer detectors 140 through 143. The effect of the low condition on lead 220 increases the signal threshold. This has the effect of inhibiting the unoperated ones of the signal slicer detectors. The high condition on lead 215 enables AND gates 150 through 153 in channel detectors 107. The enabling of these gates extends the outputs of signal slicer detectors 140 through 143 to relay cores A1 through A4, respectively.

We have assumed that an output is being provided through signal slicer detector 140. This output is therefore passed through AND gate 150, operating relay A1. At the same time, the output of AND gate 150 is applied back to OR gate 130. This feedback operates to lock in circuits 130, 140 and 150 and maintains operating relay A1. Relay A1, is, therefore, operated to connect terminal A10 to terminal A Common for a period of 37 milliseconds.

If the tone is approximately 770 Hz, 852 Hz or 941 Hz, the output is provided through signal slicer detectors 141, 142 or 143. The output is passed through a corresponding one of AND gates 151 to 153 to operate one of relays A2 to A4. The relay is therefore operated and the corresponding OR gate, detector and AND gate circuitry is locked in the same manner as the above-described operations of OR gate 130, detector 140, AND gate 150 and relay A1.

At the same time the signal voltages on leads 215 and 220 and the high tone signal on the output of limiter 109 operate the corresponding circuits in channel detectors 108 to thereby operate, in turn, an individual one of relays B1 to B4. At the same time, the operated ones of the OR gates, detectors and AND gates in channel detectors 108 lock up in the same manner as the corresponding circuitry in channel detectors 107. The operated B relay completes a path from terminal B Common through its make contacts and, with the A relay operated, instructs the voice recording machine to go to a selected operating mode. Since relay DCD is operated, the machine is enabled to go to this mode and provide the desired function.

At the termination of the 37 milliseconds the output of monopulser 212 goes back down. As a result, the output of driver 213 also drops. The low voltage on lead 215 disables AND gates 150 to 153, relay A1 is released and circuits 130, 140 and 150 are unlocked. Similarly, the B relay is released and the circuits in channel detectors 108 are unlocked. At the same time, monopulser 212 reapplies a low condition to AND gate 219 and the potential on lead 220 goes high, decreasing the threshold level to the initial level applied to detectors 140 to 143. Channel detectors 107 and 108 are therefore returned to their initial condition. If the tone pair is still being received, the output of gate 209 is up, flip-flop 218 is maintained SET and the refiring of monopulser 212 is inhibited, whereby the reregistration of the tone pair in the A and B relays is precluded.

With channel detectors 107 and 108 returned to their initial condition, and assuming the termination of the incoming tome signals from the remote subscriber, the potentials on leads 110 and 111 go down, the output potential of gate 205 correspondingly goes down and this low output potential is applied to gate 207. The output potential of AND gate 207 goes down, driving down, in turn, the output potential of AND gate 209. The negative transition at the output of gate 209 clears flip-flop 218. This terminates the flow of current through relay DCD, and ground is removed from terminal "Data Carrier Detector." At this time the channel detectors are no longer enabled to operate their associated relays and the subscriber's machine is no longer enabled to respond to control signals.

It is assumed that the subscriber machine is now performing its instructed functions; that is, it is recording, playing back, et cetera. At any time during this interval the remote subscriber may again send control tone signals. Channel detectors 107 and 108 are then operated in the same manner as previously described, operating, in turn, logic circuitry 200. In this manner the remote subscriber can at any time change the operating mode of the local subscriber equipment.

As previously pointed out, when the subscriber's machine is playing back a voice recording, reflections from the hybrid circuit may be passed to carrier detectors 107 and 108 and these reflections may constitute or simulate a control tone pair. To overcome this reflected voice signal tone pair, logic circuitry 200 momentarily releases relay IH to thereby momentarily interrupt the playback path, as previously described. It is, of course, realized that this 20 millisecond interruption is short enough so that it is not annoying to the remote listener and, in fact, may not even be noticed.

When the playback voice path is momentarily interrupted, the reflected tone pair signals also terminate. The output voltage potential applied by channel detectors 107 and 108 to leads 110 and 111 are removed. Accordingly, the output potential of AND gate 205 goes down, driving down, in turn, the output potential of AND gate 207. Since this occurs during the 20 millisecond interruption, AND gate 209 does not become enabled. Consequently, monopulser 212 does not operate and channel detectors 107 and 108 cannot operate their associated relays. The reception of the simulated control tone is thereby inhibited.

Various ways of disconnecting the data set at the termination of the call may be utilized. One method may constitute the transmission of a control tone to the subscriber equipment. The machine thereupon releases relay ER and line circuit 100, in turn, operates its switch hooks to go back "on-hook." The telephone line, now being "on-hook," signals a disconnect of the data set and returns the data set to its initial condition.

Although a specific embodiment of this invention has been shown and described, it will be understood that various modifications may be made without departing from the spirit of this invention.

We claim:

1. In a station set which includes a transmitter for sending voice frequency signals to a line and a receiver for detecting incoming signals received from the line, the incoming signals being within the voice frequency band, means responsive to signals from the line for disabling the transmitter for a momentary interval of time, and means effective during the momentary interval and responsive to the continuance of the signals from the line for enabling the receiver.

2. A station set for interconnecting a machine with a communication line, the machine being operated by control signals and having the capability of sending voice frequency signals, the station set including a receiver having means for detecting tone signals in the voice frequency band received from the line and means responsive to the detecting means for developing the control signals and further including a transmitter for applying to the line the voice frequency signals sent by the machine, characterized in that the station set includes means for precluding the development of control signals in response to the reflection of voice frequency signals applied to the line by the transmitter comprising:

means responsive to the detection of tone signals for disabling the transmitter to interrupt the application of signals to the line for a momentary interval of time and means responsive to continuance of the detection of tone signals during the momentary interval for enabling the developing means.

3. A station set in accordance with claim 2 wherein the disabling means includes timing means for determining the duration of the momentary interval of time, the timing means being arranged to determine an interval having a short duration of time so that the interruption is not annoying and may not even by noticed by one listening to the voice frequency signals sent to the line.

4. A station set in accordance with claim 3 wherein the disabling means further includes switch means interposed between an output of the transmitter and the line and operated by the timing means for blocking the application of the voice frequency signals to the line for the momentary interval.

5. A station set in accordance with claim 2 wherein the enabling means includes delay means for designating a delay period after the initiation of the momentary interval of time and means responsive to a continuance of the detection of the tone signals after the initiation of the momentary interval and operated at the termination of the delay period for enabling the developing means.

6. A station set in accordance with claim 5 wherein the delay period terminates concurrently with the termination of the momentary interval of time.

7. A station set in accordance with claim 5 wherein the enabling means further includes means for extending an output of the detecting means to an input of the developing means.

8. A station set in accordance with claim 7 wherein the extending means comprises gate means enabled by the operated means for gating the output of the detecting means to the input of the developing means.

* * * * *